(12) United States Patent
Zorn et al.

(10) Patent No.: US 10,364,379 B2
(45) Date of Patent: Jul. 30, 2019

(54) OXAZOLINE-CONTAINING AQUEOUS POLYMER DISPERSIONS FOR COMPOSITE FILM LAMINATION

(71) Applicant: BASF SE, Ludwigshafen (DE)

(72) Inventors: Matthias Zorn, Heppenheim (DE); Karl-Heinz Schumacher, Neustadt (DE)

(73) Assignee: BASF SE, Ludwigshafen (DE)

( * ) Notice: Subject to any disclaimer, the term of this patent is extended or adjusted under 35 U.S.C. 154(b) by 16 days.

(21) Appl. No.: 15/558,326

(22) PCT Filed: Mar. 8, 2016

(86) PCT No.: PCT/EP2016/054858
§ 371 (c)(1),
(2) Date: Sep. 14, 2017

(87) PCT Pub. No.: WO2016/146427
PCT Pub. Date: Sep. 22, 2016

(65) Prior Publication Data
US 2018/0066166 A1    Mar. 8, 2018

(30) Foreign Application Priority Data
Mar. 18, 2015   (EP) .................................. 15159621

(51) Int. Cl.
| C09J 139/04 | (2006.01) |
| C08F 265/06 | (2006.01) |
| C09D 151/00 | (2006.01) |
| C09J 137/00 | (2006.01) |

(52) U.S. Cl.
CPC ........... *C09J 139/04* (2013.01); *C08F 265/06* (2013.01); *C09D 151/003* (2013.01); *C09J 137/00* (2013.01); *C09J 2205/31* (2013.01)

(58) Field of Classification Search
CPC .... C09J 139/04; C09J 137/00; C09J 2205/31; C08F 265/06; C09D 151/003
USPC ...................................................... 428/411.1
See application file for complete search history.

(56) References Cited

U.S. PATENT DOCUMENTS

| 4,866,856 A * | 9/1989 | Feeley .................... F26B 5/005 |
| | | 34/340 |
| 4,886,856 A * | 12/1989 | Chen ........................ C08L 25/08 |
| | | 525/73 |
| 2008/0029885 A1* | 2/2008 | Meir ..................... H01L 25/0657 |
| | | 257/723 |
| 2008/0293885 A1 | 11/2008 | Morimoto et al. |

FOREIGN PATENT DOCUMENTS

| EP | 0 176 609 A1 | 4/1986 |
| JP | 2013-57081 A | 3/2013 |
| WO | WO 2006/112538 A1 | 10/2006 |
| WO | WO 2008/102816 A1 | 8/2008 |
| WO | WO-2008102816 A1 * | 8/2008 | ............... C09D 5/02 |
| WO | WO 2011/154920 A1 | 12/2011 |

OTHER PUBLICATIONS

International Search Report and Written Opinion dated May 13, 2016 in PCT/EP2016/054858.

* cited by examiner

*Primary Examiner* — Michael Bernshteyn
(74) *Attorney, Agent, or Firm* — Oblon, McClelland, Maier & Neustadt, L.L.P.

(57) ABSTRACT

Described are aqueous polymer dispersions for composite film lamination and a multistage process for preparing them from ethylenically unsaturated, radically polymerizable monomers. In a first stage, a first polymer is prepared by radical emulsion polymerization. In a further stage, an aqueous polymer dispersion is prepared in the presence of the first polymer. The monomers of the first stage comprise monomers with acid groups. The monomers of the further stage comprise monomers having oxazoline groups. The polymerization of the first stage takes place at a low pH of less than 5. The acid groups of the first polymer are neutralized before the polymerization of the further stage. The aqueous polymer dispersions can be used as adhesives for producing composite films.

18 Claims, No Drawings

OXAZOLINE-CONTAINING AQUEOUS POLYMER DISPERSIONS FOR COMPOSITE FILM LAMINATION

The invention relates to aqueous polymer dispersions for composite film lamination and to a multistage process for preparing them from ethylenically unsaturated, radically polymerizable monomers. In a first stage, a first polymer is prepared by radical emulsion polymerization. In a further stage, an aqueous polymer dispersion is prepared in the presence of the first polymer. The monomers of the first stage comprise monomers with acid groups. The monomers of the further stage comprise monomers having oxazoline groups. The polymerization of the first stage takes place at a low pH of less than 5. The acid groups of the first polymer are neutralized before the polymerization of the further stage. The aqueous polymer dispersions can be used as adhesives for producing composite films.

Laminating adhesives for composite film lamination, based on aqueous polymer dispersions, generally require a crosslinker in order to obtain an increase in the chemical resistance or the heat stability. Frequently for this purpose the laminating adhesive dispersions are formulated using isocyanate crosslinkers. Disadvantages are that these formulations have a relatively low working time (known as pot life) and may be objectionable on health grounds. Generally speaking, moreover, conventional aqueous polymer dispersions require relatively high quantities of emulsifier in order to stabilize the dispersion. A disadvantage is that high quantities of emulsifier may lower the instantaneous tack of aqueous laminating adhesive formulations. Polymer dispersions prepared using oxazoline monomers are described in EP 0176609, JP 2013-057081,or WO 06/112538. These polymer dispersions include relatively large quantities of emulsifier, a disadvantage for composite film laminating adhesive applications. Polymer dispersions for composite film lamination without oxazoline monomers are described in WO 2011/154920.

The object was to provide aqueous polymer dispersions for composite film lamination that have an extremely long pot life, an extremely low level of objectionability on health grounds, and the capacity to be able to be used for producing composite films having extremely good chemical resistance, extremely good instantaneous adhesion, and extremely good heat stability.

It has been found that the object can be achieved by the preparation process elucidated in more detail below and by the polymer dispersions obtainable by said process. The invention provides an aqueous polymer dispersion for composite film lamination, prepared by radical emulsion polymerization, where initially in a first stage in aqueous medium a first polymer dispersed in water is prepared by radical emulsion polymerization, the first polymer being prepared from a first composition comprising ethylenically unsaturated, radically polymerizable monomers, and where in a further stage a polymer dispersion is prepared in aqueous medium and in the presence of the first polymer by radical emulsion polymerization of a further composition, which is different from the first composition and comprises ethylenically unsaturated, radically polymerizable monomers, where the monomers of the first stage comprise at least one monomer having at least one acid group, in an amount of at least 0.1 part by weight, based on 100 parts by weight of the monomers of all stages, and where the monomers of the further stage comprise at least one monomer having at least one oxazoline group, and where the polymerization of the first stage takes place at a pH less than 5,preferably less than or equal to 4.5,and, before the polymerization of the further stage, the acid groups are neutralized with volatile base, preferably aqueous ammonia solution, to an extent such that the pH of the polymer dispersion before the further stage is greater than 5,preferably greater than or equal to 5.5, and where in total less than 0.5 part by weight, based on 100 parts by weight of monomers, of emulsifier, or no emulsifier, is used, and where the glass transition temperature of the polymer prepared is less than −10° C.

The invention also provides a corresponding process for preparing aqueous polymer dispersions. The process described encompasses the preparation of polyacrylate dispersions in particular for application in composite film lamination, by a specially adapted, so-called (multistage) one-pot process, which is based on the stabilization of emulsion polymers by protective colloids formed "in situ", i.e., during the emulsion polymerization.

The principle of the process of the invention is based on the preferably seed-controlled formation of small polymer particles in aqueous dispersion in a first polymerization stage by radical polymerization of a first monomer composition comprising at least one ethylenically unsaturated monomer having at least one acid group (e.g., a mixture of alkyl (meth)acrylate and (meth)acrylic acid) and also subsequent neutralization, and subsequent feeding of the principal monomers—of a mixture of alkyl (meth)acrylates, oxazoline monomers, and optionally styrene, for example. Following neutralization, the particles formed in the first stage are able to become active as protective colloids and so to stabilize the polymer dispersion of the invention. At the beginning of the reaction of the first stage, the pH in the reaction vessel falls continually as a result of continuous addition of acid. As a result of this, the polymer particles formed in the first polymerization stage are in undissolved form. Only on neutralization (e.g., by addition of ammonia) before the polymerization stage comprising the oxazoline-containing monomer is a protective colloid formed which is able to exert a dispersion-stabilizing effect in the emulsion polymerization that ensues with addition of the principal monomers, since the protective colloid is composed preferably of apolar alkyl (meth)acrylate units and polar, neutralized (meth)acrylic or itaconic acid units.

The invention also provides the use of the aqueous polymer dispersions of the invention as a laminating adhesive, for producing laminating adhesives, or in the production of composite films; corresponding composite films; and also a corresponding process for producing composite films, which involves providing an aqueous polymer dispersion of the invention and bonding at least two films with one another using the aqueous polymer dispersion.

In the text below, there is occasional use of the designation "(meth)acryl . . . ", and similar designations, as an abbreviated notation for "acryl . . . or methacryl . . . ". In the designation Cx alkyl (meth)acrylate and analogous designations, x denotes the number of C atoms in the alkyl group.

The glass transition temperature is determined by differential scanning calorimetry (ASTM D 3418-08,midpoint temperature). The glass transition temperature of the polymer in the polymer dispersion is the glass transition temperature obtained on evaluation of the second heating curve (heating rate 20° C./min).

The polymer dispersions prepared in accordance with the invention are obtainable by radical emulsion polymerization of ethylenically unsaturated compounds (monomers). The polymerization both of the first stage and also of the further stage takes place preferably with no emulsifier or with little emulsifier in the sense that no emulsifier is added to stabilize the polymer dispersion of the invention. Emulsifiers are nonpolymeric, amphiphilic, surface-active substances that are added to the polymerization mixture. Small amounts of emulsifiers, present as a result, for example, of the use of emulsifier-stabilized polymer seed, are not detrimental. A total of less than 0.5 part by weight, more particularly less than 0.4 part by weight, less than 0.3 part by weight of emulsifier, based on 100 parts by weight of all monomers of the polymer dispersion, or no emulsifier is used. In particular there is preferably no reactive emulsifier—that is, copolymerizable emulsifier—used either.

In the first stage a polymer is prepared from monomers which comprise at least one monomer having at least one acid group, in an amount of at least 0.1 part by weight, preferably from 1 to 10 parts by weight, based on 100 parts by weight of the total amount of all monomers. Preferably, in the first stage, monomers containing acid groups (acid monomers) are copolymerized with monomers without acid groups, more particularly nonionic monomers. The weight ratio of monomers containing acid groups to monomers without acid groups in the monomer mixture of the first polymerization stage is preferably in the range from 0.5:99.5 to 30:70, preferably from 1:99 to 20:80 or from 1:99 to 15:85.

At low pH levels of 2 to 3, for example, and with non-neutralized acid groups, the polymer of the first stage is not water-soluble, but is dispersed in water. If neutralizing agent is added before the polymerization of the second stage, there is an increase, with increasing degree of neutralization of the acid groups, in the water-solubility of the polymer of the first stage. With increasing water solubility, the polymer of the first stage is able to act as a protective colloid for the polymer of the further stage and is able to stabilize the polymer dispersion with high polymer solids content. Protective colloids are polymeric compounds which, on solvation, bind large amounts of water and are capable of stabilizing dispersions of water-insoluble polymers. In contrast to emulsifiers, they generally do not lower the interfacial tension between polymer particles and water. The number-average molecular weight of the protective colloids is preferably above 1000 g/mol, more particularly above 2000 g/mol, and preferably up to 50000 g/mol or up to 10000 g/mol. As for example from 1000 to 100000 g/mol, from 1000 to 10000 g/mol or from 2000 to 10000 g/mol.

The polymers of the first stage that become effective as protective colloids on neutralization are used preferably in an amount of 1% to 60% or of 5% to 50% by weight, or of 7% to 40% or of 10% to 30% by weight (particularly when the total solids content of the polymer dispersion of the invention is more than 50% by weight), based on 100% by weight of the monomers to be polymerized.

The acid groups of the polymer of the first stage are neutralized partially or completely with suitable bases. It is preferred to use volatile bases, more particularly volatile organic bases, or ammonia. Ammonia is used preferably in the form of aqueous ammonia solution. Volatile bases and volatile amines are preferably those having a boiling point of below 60° C., preferably below 20° C., under atmospheric pressure.

Monomers with acid groups (acid monomers) are used in an amount of at least 0.1 part by weight and preferably less than 5 parts by weight per 100 parts by weight of monomers—for example, from 0.1 to 4 parts by weight. Acid monomers are ethylenically unsaturated acid monomers, examples being ethylenically unsaturated carboxylic acids, vinylphosphonic acid, or copolymerizable phosphoric acids. Ethylenically unsaturated carboxylic acids used are preferably alpha,beta-monoethylenically unsaturated monocarboxylic and dicarboxylic acids having 3 to 6 C atoms in the molecule. Examples of such acids are acrylic acid, methacrylic acid, itaconic acid, maleic acid, fumaric acid, crotonic acid, vinylacetic acid, vinyllactic acid, and ethylenically unsaturated phosphonic acids. Preference is given to acrylic acid and methacrylic acid and a mixture thereof, particular preference to acrylic acid.

The acid monomers used in the first stage can be copolymerized in the first stage with monomers without acid group. The polymer of the first stage is preferably formed from at least 40% by weight of nonionic principal monomers, defined in more detail below, and also from a second kind of monomer, selected from ethylenically unsaturated acid monomers. The polymer of the first stage may, furthermore, optionally be formed from further, preferably nonionic, monomers. The polymer of the first stage is preferably constructed of at least 40%, more particularly of 40% to 80% or of 50% to 80%, by weight of principal monomers which are selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers. Principal monomers for the polymer of the first stage are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decylstyrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene. Preferred as principal monomers for the polymer of the first stage are the $C_1$ to $C_{10}$ alkyl acrylates and methacrylates, more particularly $C_1$ to $C_8$ alkyl acrylates and methacrylates. With very particular preference the polymer of the first stage is what is called a straight acrylate, meaning that it is formed (apart from acid monomers) exclusively from (meth)acrylic acid derivatives (e.g., the esters thereof).

In one preferred embodiment, the polymer of the first stage is a copolymer which
  (i) is used in an amount of 5% to 40% by weight, based on 100% by weight of the total monomers to be polymerized in all stages,
  (ii) is composed of at least 50% by weight and up to 99.9% by weight, based on the sum of the monomers of all stages, of principal monomers which are selected from the group consisting of C1 to C10 alkyl (meth) acrylates and mixtures of these monomers, and (iii) is composed of at least 0.1% by weight and up to 4% by weight, based on the sum of the monomers of all stages, of ethylenically unsaturated acid monomers, which are preferably selected from acrylic acid, methacrylic acid, itaconic acid, and a mixture thereof.

One embodiment of the invention uses at least one chain transfer agent in the polymerization of the first stage. By means of such an agent it is possible to reduce the molar mass of the emulsion polymer, by a chain termination reaction. The agents are attached in the process to the polymer, generally to the chain end. The amount of the agents is in particular 0.05 to 4 parts by weight, more preferably 0.05 to 0.8 part by weight, and very preferably 0.1 to 0.6 part by weight, based on 100 parts by weight of the monomers of all stages to be polymerized. Examples of suitable agents include compounds having a thiol group such as tert-butyl mercaptan, thioglycolic acid ethylhexyl ester, mercaptoethanol, mercaptopropyltrimethoxysilane or tert-dodecyl mercaptan. The agents are generally low molecular weight compounds with a molar weight of less than 2000, more particularly less than 1000,g/mol.

In one preferred embodiment of the invention, the polymerization of the first stage takes place in the presence of seed latex. Seed latex is an aqueous dispersion of finely divided polymer particles having an average particle diameter of preferably 20 to 40 nm. Seed latex is used in an amount of preferably 0.05% to 5% by weight, more preferably of 0.1% to 3% by weight, based on the total monomer amount of all stages. A suitable latex, for example, is one based on polystyrene or based on polymethyl methacrylate. A preferred seed latex is polystyrene seed.

The monomers containing oxazoline groups are used preferably in an amount in the range from 0.5 to 4 parts by weight, more preferably from 0.75 to 3 parts by weight, per 100 parts by weight of monomers of all stages. The monomers comprising oxazoline groups are preferably used exclusively in the further polymerization stage. The monomers containing oxazoline groups comprise a monoethylenically unsaturated, hydrophilic monomer which comprises at least one oxazoline group, more particularly at least one 2-oxazoline group (also called oxazoline monomer below). The monomer preferably comprises exactly one oxazoline group, more particularly exactly one 2-oxazoline group.

An oxazoline monomer is an organic compound comprising at least one ethylenically unsaturated group and at least one oxazoline group. For the purposes of the present invention, an oxazoline group refers to a heterocyclic compound which comprises a five-membered ring comprising exactly one oxygen atom and exactly one nitrogen atom. More particularly the oxazoline group is a 2-oxazoline group, which can be described by the following structural element.

The oxazoline monomer is preferably a compound of formula:

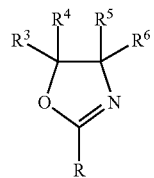

where the radicals have the following definitions:

R is a $C_2$-$C_{20}$ alkenyl radical comprising at least one ethylenically unsaturated group;

$R^3$, $R^4$, $R^5$ and $R^6$ are selected independently of one another from H, halogen, $C_{1-20}$ alkyl, $C_{2-20}$ alkenyl, $C_{6-20}$ aryl, $C_{7-32}$ arylalkyl, $C_{1-20}$ hydroxyalkyl, $C_{1-20}$ aminoalkyl, and $C_{1-20}$ haloalkyl, and preferably are selected from H, halogen, and $C_{1-20}$ alkyl.

An ethylenically unsaturated group denotes a terminal C=C double bond.

Alkyl denotes a univalent radical consisting of a linear, branched or cyclic hydrocarbon group, preferably of a linear or branched hydrocarbon chain, more particularly comprising 1 to 20 carbon atoms, preferably 1 to 18 carbon atoms, more preferably 1 to 12 carbon atoms. The alkyl radical may for example be methyl, ethyl, n-propyl, or isopropyl.

Alkenyl denotes a univalent radical consisting of a linear or branched hydrocarbon chain, more particularly comprising 2 to 20 carbon atoms, preferably 2 to 18 carbon atoms, more preferably 2 to 12 carbon atoms, which comprises one or more C—C double bonds, it being possible for the C—C double bonds to occur within the hydrocarbon chain or at the end of the hydrocarbon chain (C=C double bond terminally). An alkenyl radical may for example be an allyl radical.

Aryl denotes a substituted or unsubstituted aromatic hydrocarbon group, more particularly comprising 6 to 20 carbon atoms. The aryl radical may for example be a phenyl group.

Arylalkyl denotes a univalent radical derived from a linear or branched alkyl radical, more particularly comprising 1 to 20 carbon atoms, preferably 2 to 18 carbon atoms, more preferably 2 to 12 carbon atoms, by the replacement of one or more hydrogen atoms with an aryl group, the aryl group being a substituted or unsubstituted aromatic hydrocarbon group, more particularly comprising 6 to 14 carbon atoms. The aromatic hydrocarbon group may for example be phenyl; the arylalkyl radical may for example be a benzyl radical.

Halogen denotes a substituent selected from fluorine, chlorine, bromine or iodine, preferably chlorine.

Haloalkyl denotes a univalent radical derived from a linear or branched alkyl radical, more particularly comprising 2 to 20 carbon atoms, preferably 2 to 18 carbon atoms, more preferably 2 to 12 carbon atoms, by the replacement of one or more hydrogen atoms with a halogen atom (—F, —Cl, —Br, —I, more particularly Cl). Similar comments apply in respect of the radicals hydroxyalkyl and aminoalkyl.

Preferably R is a $C_{1-10}$ alkenyl radical, preferably a $C_{1-6}$ alkenyl radical, comprising at least one ethylenically unsaturated group. In one preferred embodiment, the radical R comprises exactly one ethylenically unsaturated group. The radical R is selected more particularly from vinyl, allyl, isopropenyl (2-propen-2-yl), 2-propen-1-yl, 3-buten-1-yl, or 4-buten-1-yl. Especially preferably R is vinyl or isopropenyl, more preferably isopropenyl.

The radicals $R^3$, $R^4$, $R^5$, and $R^6$ are preferably selected, independently of one another, from H, halogen, $C_{1-10}$ alkyl, $C_{6-12}$ aryl, $C_{7-13}$ arylalkyl, $C_{1-10}$ alkoxy, $C_{1-10}$ hydroxyalkyl, $C_{1-10}$ aminoalkyl, and $C_{1-10}$ haloalkyl, and more particularly are selected from H and $C_{1-6}$ alkyl, very preferably from H, methyl, ethyl, n-propyl, isopropyl, n-butyl, n-pentyl, and n-hexyl, and more particularly are selected from H, methyl, and ethyl. In one preferred embodiment, at least two of the radicals $R^3$, $R^4$, $R^5$, and $R^6$ are H. In one preferred embodiment, the radicals $R^3$ and $R^4$ are H. In one preferred embodiment, all radicals $R^3$, $R^4$, $R^5$, and $R^6$ are H. In one preferred embodiment, at least two of the radicals $R^3$, $R^4$, $R^5$, and $R^6$ are H.

In one preferred embodiment, the radicals $R^3$, $R^4$, $R^5$, and $R^6$ independently of one another are selected from H, methyl, and ethyl, and at least two of the radicals $R^3$, $R^4$, $R^5$, and $R^6$ are H, the radicals $R^3$ and $R^4$ preferably being H.

With more particular preference the oxazoline monomers comprise at least one monomer selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline. Particular preference is given to the use of 2-vinyl-2-oxazoline and/or 2-isopropenyl-2-oxazoline; especially preferred is 2-isopropenyl-2-oxazoline (iPOx).

Preferably at least 60%, more preferably at least 80%, e.g., from 80% to 99.5%, more preferably at least 90%, by weight of the monomers used for the polymerization of the further stage comprise one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Vinylaromatic compounds contemplated include vinyltoluene, alpha- and para-methylstyrene, alpha-butylstyrene, 4-n-butylstyrene, 4-n-decyl-styrene, and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether and vinyl isobutyl ether. Vinyl ethers of alcohols comprising 1 to 4 C atoms are preferred. As hydrocarbons having 4 to 8 C atoms and two olefinic double bonds, mention may be made of butadiene, isoprene, and chloroprene.

Preferred as principal monomers for the polymerization of the further stage are the $C_1$ to $C_{10}$ alkyl acrylates and methacrylates, more particularly $C_1$ to $C_8$ alkyl acrylates and methacrylates, and vinylaromatics, especially styrene, and mixtures thereof. Very particular preference is given to methyl acrylate, methyl methacrylate, ethyl acrylate, n-butyl acrylate, n-butyl methacrylate, n-hexyl acrylate, octyl acrylate, and 2-ethylhexyl acrylate, 2-propylheptyl acrylate, and mixtures of these monomers.

Besides the principal monomers, the monomers for the polymerization of the further stage may comprise further monomers, examples being monomers comprising hydroxyl groups, especially $C_1$-$C_{10}$ hydroxyalkyl (meth)acrylates, and also (meth)acrylamide. Further monomers that may be mentioned are, moreover, phenyloxyethylglycol mono(meth)acrylate, glycidyl acrylate, glycidyl methacrylate, and amino (meth)acrylates such as 2-aminoethyl (meth)acrylate. Crosslinking monomers are further monomers that may also be mentioned. The monomers used in the further stage preferably comprise not more than 1 part by weight of monomers with acid groups, or no monomers with acid groups, based on the sum of all monomers.

In particular, the monomers for the polymerization of the further stage are selected to an extent of at least 60%, more preferably at least 80%, e.g., from 60% to 99.5%, and very preferably at least 95%, by weight, of at least one $C_1$ to $C_{20}$ alkyl (meth)acrylate.

The polymers of the first stage and of the further stage (apart from acid monomers and from the monomers comprising oxazoline groups) are preferably straight acrylates, in other words polymers which apart from monomers comprising oxazoline groups and acid monomers (preferably (meth)acrylic acid and/or itaconic acid) are formed exclusively of derivatives of (meth)acrylic acid (preferably the esters thereof).

The monomers of the polymerization of the further stage are preferably selected such that the glass transition temperature, calculated for a polymer prepared from the monomers of the further stage, is in the range from −45° C. to +15° C., more particularly from −40° C. to +10° C. By a controlled variation of the nature and amount of the monomers it is possible in accordance with the invention for the skilled person to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123, and in accordance with Ullmann's Encyclopadie der technischen Chemie, Volume 19, page 18, 4th Edition, Verlag Chemie, Weinheim, 1980), the calculation of the glass transition temperature of copolymers is subject in good approximation to the following equation:

$$1/T_g = x^1/T_g^1 + x^2/T_g^2 + \ldots + x^n/T_g^n,$$

where $x^1$, $x^2$, .... $x^n$ are the mass fractions of the monomers 1, 2,.... n and $T_g^1$, $T_g^2$, .... $T_g^n$ are the glass transition temperatures of the polymers synthesized in each case only from one of the monomers 1, 2,.... n, in degrees Kelvin. The $T_g$ values for the homopolymers of the majority of monomers are known and are listed in Ullmann's Encyclopedia of Industrial Chemistry, Vol. A21, page 169, 5th Edition, V C H Weinheim, 1992; other sources of glass transition temperatures of homopolymers include, for example, J. Brandrup, E. H. Immergut, Polymer Handbook, 1st Edition, J. Wiley, New York 1966, 2nd Edition, J. Wiley, New York 1975, and 3rd Edition, J. Wiley, New York 1989. For ethyl acrylate a figure of −13° C. is used.

The actual glass transition temperature of the polymer in the polymer dispersion of the invention (all stages) is preferably in the region of less than or equal to −10° C., e.g., from −40° C. to 10° C. The actual glass transition temperature may be determined by means of differential scanning calorimetry (ASTM D 3418-08, midpoint temperature). The figure in question here is the glass transition temperature obtained on evaluation of the second heating curve (heating rate 20° C./min).

Between the polymerization of the first polymerization stage, comprising acid monomers, and the further polymerization stage, comprising oxazoline monomers, it is possible for there to be one or more additional polymerization stages, which may preferably likewise comprise acid monomers and may in principle include the same monomers, in terms of type and quantities, as the first polymerization stage.

The weight ratio of the amount of monomers used in the first stage and optionally in additional (preferably acid-containing) stages to the amount of the monomers used in the further, oxazoline-containing stage is preferably from 10:90 to 90:10 or from 10:90 to 60:40, more preferably from 10:90 to 65:35.

The polymer dispersion of the invention is prepared by emulsion polymerization. In the emulsion polymerization, ethylenically unsaturated compounds (monomers) are polymerized in water, with the use typically of ionic and/or nonionic emulsifiers and/or protective colloids or stabilizers as interface-active compounds for stabilizing the monomer droplets and the polymer particles subsequently formed from the monomers. In accordance with the invention, however, the polymerization of all stages takes place wholly or virtually without emulsifier. For the stabilization of the polymer dispersion formed in the polymerization of the further stages, the polymer of the first stage is used, which is converted in situ, by addition of neutralizing agent, from a water-insoluble polymer which is not active as a protective colloid, into a polymer which is active as a protective colloid.

The neutralization of acid groups of the first polymer takes place preferably by feed addition of a neutralizing agent before the polymerization of the further stage. After all of the monomers have been fed in, the amount of neutralizing agent present in the polymerization vessel is preferably the amount needed to neutralize at least 10%, preferably 30% to 100% or 30% to 90%, of acid equivalents.

The emulsion polymerization of the first and second stages may be started using water-soluble initiators. Water-soluble initiators are, for example, ammonium salts and alkali metal salts of peroxodisulfuric acid, e.g., sodium peroxodisulfate, hydrogen peroxide, or organic peroxides, e.g., tert-butyl hydroperoxide. Also suitable as initiators are what are called reduction-oxidation (redox) initiator systems. The redox initiator systems are composed of at least one, usually inorganic, reducing agent and one organic or inorganic oxidizing agent. The oxidizing component comprises, for example, the emulsion polymerization initiators already stated above. The reducing component comprises, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to occur in a plurality of valence states. Typical redox initiator systems are, for example, ascorbic acid/iron(II) sulfate/sodium peroxydisulfate, tert-butyl hydroperoxide/sodium disulfite, and tert-butyl hydroperoxide/Na hydroxymethanesulfinic acid. The individual components, the reducing component for example, may also be mixtures, an example being a mixture of the sodium salt of hydroxymethanesulfinic acid with sodium disulfite.

The stated initiators are used mostly in the form of aqueous solutions, with the lower concentration being determined by the amount of water that is acceptable in the dispersion, and the upper concentration by the solubility of the respective compound in water. Generally speaking, the concentration of the initiators is 0.1% to 30%, preferably 0.5% to 20%, more preferably 1.0% to 10%, by weight, based on the monomers to be polymerized. It is also possible for two or more different initiators to be used in the emulsion polymerization.

The chain transfer agents stated above may be used in the polymerization of the further stage and optional additional stages. Preferably, however, the polymerization of the further stage and optional additional stages takes place without addition of further chain transfer agents.

The emulsion polymerization takes place in general at 30 to 130° C., preferably at 50 to 90° C. The polymerization medium may be composed of water alone, or of mixtures of water and water-miscible liquids such as methanol. It is preferred to use just water. The emulsion polymerization of the first stage may be carried out either as a batch operation or in the form of a feed process, including staged or gradient procedures. For more effective setting of the particle size it is preferred, in the polymerization, to include a polymer seed in the initial charge.

The way in which the initiator is added to the polymerization vessel in the course of the free-radical aqueous emulsion polymerization is known to a person of ordinary skill in the art. It may be included in its entirety in the initial charge to the polymerization vessel, or introduced, continuously or in stages, at the rate at which it is consumed in the course of the radical aqueous emulsion polymerization. In each individual case, this will depend on the chemical nature of the initiator system and on the polymerization temperature. It is preferred to include a portion in the initial charge and to supply the remainder to the polymerization zone at the rate of its consumption. For the purpose of removing the residual monomers, it is customary to add initiator after the end of the actual emulsion polymerization as well, i.e., after a monomer conversion of at least 95%. The individual components may be added to the reactor, in the case of the feed process, from above, in the side or from below, through the reactor bottom.

The emulsion polymerization produces aqueous polymer dispersions having solids contents generally of 15% to 75%, preferably of 40% to 75%, and more preferably of greater than or equal to 50%, by weight. For a high space/time yield of the reactor, dispersions with a very high solids content are preferred. In order to be able to attain solids contents >60% by weight, a bimodal or polymodal particle size ought to be set, since otherwise the viscosity becomes too high and the dispersion can no longer be handled. Producing a new generation of particles can be accomplished, for example, by adding seed, by adding excess amounts of emulsifier, or by adding miniemulsions. A further advantage associated with the low viscosity at high solids content is the improved coating behavior at high solids contents. Producing one or more new generations of particles can be done at any desired point in time. This point in time is guided by the particle size distribution that is aimed at for a low viscosity.

The polymer prepared in this way is used preferably in the form of its aqueous dispersion. The size distribution of the dispersion particles may be monomodal, bimodal or multimodal. In the case of monomodal particle size distribution, the average particle size of the polymer particles dispersed in the aqueous dispersion is preferably less than 400 nm, more particularly less than 200 nm. By average particle size here is meant the $d_{50}$ of the particle size distribution, i.e., 50% by weight of the total mass of all the particles have a particle diameter smaller than the $d_{50}$. The particle size distribution can be determined in a known way by hydrodynamic chromatography (HDC). In the case of bimodal or multimodal particle size distribution, the particle size may be up to 1000 nm. The pH of the polymer dispersion is set preferably to a pH of more than 5, more particularly to a pH between 5.5 and 8.

The polymer dispersions of the invention are used in accordance with the invention in aqueous adhesive preparations for the production of laminates, i.e., in aqueous laminating adhesive preparations for the bonding of substrates of large surface areas, more particularly for the production of composite films.

The present invention hence also provides a process for producing composite films that uses an aqueous adhesive preparation which comprises at least one polymer dispersion of the invention. In this process, the aqueous polymer dispersions may be used as they are or after formulation with typical auxiliaries. Examples of typical auxiliaries include wetting agents, thickeners, other protective colloids, light stabilizers, biocides, defoamers, etc. The adhesive preparations of the invention do not require the addition of plasticizing resins (tackifiers) or other plasticizers. In the process for producing composite films, at least two films are bonded with one another using the aqueous polymer dispersion.

In the process of the invention for producing composite films, the polymer dispersion of the invention, or an appropriately formulated preparation, is applied to the large-surface-area substrates to be bonded, preferably with a layer thickness of 0.1 to 20 g/m², more preferably 1 to 7 g/m², by means, for example, of knife coating, spreading, etc. Typical coating techniques may be employed, examples being roller coating, reverse roller coating, gravure roller coating, reverse gravure roller coating, brush coating, rod coating, spray coating, air brush coating, meniscus coating, curtain coating or dip coating. After a short time for the water of the dispersion to evaporate (preferably after 1 to 60 seconds), the coated substrate may then be laminated with a second substrate, the temperature being able, for example, to be 20 to 200° C., preferably 20 to 100° C., and the pressure being able to be, for example, 100 to 3000 kN/m², preferably 300 to 2000 kN/m².

The polymer dispersion of the invention is employed preferably as a one-component composition, i.e., without additional crosslinking agents, more particularly without isocyanate crosslinkers. At least one of the films may be metalized or printed on the side that is coated with adhesive. Examples of suitable substrates include polymer films, more particularly of polyethylene (PE), oriented polypropylene (OPP), unoriented polypropylene (CPP), polyamide (PA), polyethylene terephthalate (PET), polyacetate, cellophane, polymer films (vapor-)coated with metal, e.g., with aluminum (metalized films for short), or metal foils, of aluminum, for example. The stated films and foils may be bonded with one another or with a foil or film of a different type—for example, polymer films with metal foils, different polymer films with one another, etc. The stated foils and films may also, for example, be printed with printing inks.

One embodiment of the invention is a composite film produced using one of the aqueous polymer dispersions of the invention as described above, the material of a first film being selected from OPP, CPP, PE, PET, and PA, and the material of a second film being selected from OPP, CPP, PE, PET, PA, and metal foil. In one embodiment of the invention, the first film and/or the second film is metalized or printed on the respective side coated with the polymer dispersion of the invention. The thickness of the substrate films may be, for example, from 5 to 100 μm, preferably from 5 to 40 μm.

Surface treatment of the film substrates prior to coating with a polymer dispersion of the invention is not absolutely necessary. Better results, however, may be obtained if the surface of the film substrates is modified prior to coating. In this case it is possible to employ typical surface treatments, an example being corona treatment, for the purpose of intensifying the adhesion effect. The corona treatment or other surface treatments are carried out to the extent required for sufficient wettability with the coating composition. Typically, corona treatment of approximately 10 watts per square meter per minute is sufficient for this purpose. Alternatively or additionally it is also possible, optionally, to use primers or tie coats between film substrate and adhesive coating. Furthermore, other, additional functional layers may be present on the composite films, examples being barrier layers, print layers, color layers or varnish layers, or protective layers. These functional layers may be located externally, i.e., on the side of the film substrate facing away from the adhesive-coated side, or internally, between film substrate and adhesive layer.

It is an advantage of the invention that a wide variety of different substrates can be bonded with one another, i.e., laminated, with the polymer dispersions of the invention ensuring effective adhesion of the adhesive preparation to the substrates and producing a high strength in the bonded assembly. Moreover, the polymer dispersions of the invention are notable for good instantaneous adhesion and good heat stability.

Particular advantages of the preparation process of the invention and of the products of the invention are the following in particular:
- long potlife, preferably at least 10 days at 50° C.
- good chemical resistance,
- good instantaneous adhesion, preferably at least 1.5 N/15 mm
- good heat stability, preferably more than 0.3 N/15 mm at 90° C.
- good peel strength, preferably at least 1.8 N/15 mm after 24 hours
- emulsifier-free or virtually emulsifier-free operation is possible (in particular, small amounts of emulsifier when using an emulsifier-stabilized polymer seed, for example, are not detrimental)
- cost saving by comparison with other protective colloid-stabilized polymer dispersions, since, because of the in situ preparation of the protective colloid, there is no need for separate synthesis, transport, and storage of the protective colloid

EXAMPLES

Determination of Particle Size

The particle size is determined by hydrodynamic fractionation using a PSDA (Particle Size Distribution Analyzer) from Polymer Labs. The CartridgePL0850-1020 column type used is operated with a flow rate of 2 ml/min. The samples are diluted to an absorption of 0.03 AU/μl with the eluent solution. The sample is eluted, through the size exclusion principle, in dependence on the hydrodynamic diameter 10. The eluent contains 0.2% by weight of dodecyl poly(ethylene glycol ether)23, 0.05% by weight of sodium dodecyl sulfate, 0.02% by weight of sodium dihydrogenphosphate, and 0.02% by weight of sodium azide in deionized water. The pH is 5.8. The elution time is calibrated using polystyrene latices. Measurement takes place in the 20 nm to 1200 nm range. Detection is carried out using a UV detector at a wavelength of 254 nm.

Determination of Glass Transition Temperature:

The glass transition temperature is measured by means of differential scanning calorimetry in accordance with ASTM D 3418-08. For conditioning, the polymers are poured out, dried overnight, then dried at 120° C. in a vacuum drying cabinet for 1 hour. At measurement, the sample is heated to 150° C., cooled rapidly, and then measured on heating at 20° C./min up to 150° C. The value reported is the mid-point temperature.

Example 1 Two-Stage Polymer Dispersion (2.36 pphm IPOx Tg −32° C.)

A 2L reactor with anchor stirrer, heated to 80° C., was filled with 5.9 g of a polystyrene seed (solids content: 33%, particle size: 30 nm) and 166.5 g of deionized water. When the internal temperature reached 80° C., 46.4 g of 7% strength sodium peroxodisulfate solution were added and the mixture was stirred for 2 minutes. This was followed by the metered addition over 60 minutes of 274.4 g of an emulsion consisting of 92.7 g of deionized water, 6.5 g of itaconic acid, 3.3 g of methacrylic acid, 1.2 g of sodium lauryl polyethoxysulfate (Disponil® FES 27, 28% strength in water, BASF SE), 110.5 g of n-butyl acrylate, 34.1 g of methyl acrylate, and 13.0 g of styrene. At the same time the reaction temperature was raised to 85° C. over 60 minutes. After the end of the first emulsion feed, the pH was adjusted to 7.5 using 3.7% strength ammonia over 10 minutes. Then a second emulsion feed, consisting of 92.7 g of deionized water, 4.6 g of sodium lauryl polyethoxysulfate (Disponil® FES 27, 28% strength in water, BASF SE), 29.3 g of styrene, 423.4 g of n-butyl acrylate, 15.3 g of isopropenyloxazoline, and 14.6 g of methyl acrylate, was metered in over 120 minutes. After the end of the feed, 41.6 g of deionized water were added and the temperature was lowered to 80° C. At an internal temperature of 80° C., 35.5 g of acetone bisulfite (7% strength) and 13.0 g of tert-butyl hydroperoxide (10% strength) were metered in over 60 minutes. This was followed by the addition of 0.3 g of ammonia (25% strength) and 41.6 g of deionized water, and the experiment was cooled to room temperature. After cooling, the dispersion was filtered through a 125 μm Perlon filter. The dispersion had a solids content of 49.8%, a pH of 7.4,an overall glass transition temperature of −32° C., and a particle size of 222 nm.

Example 2 Two-Stage Polymer Dispersion (1 pphm IPOx)

A 2L reactor with anchor stirrer, heated to 80° C., was filled with 6.1 g of a polystyrene seed (SC: 33%, PS: 30 nm) and 163.2 g of deionized water. When the internal temperature reached 80° C., 45.0 g of 7% strength sodium peroxodisulfate solution were added and the mixture was stirred for 2 minutes. This was followed by the metered addition over 120 minutes of 302.7 g of an emulsion consisting of 163.04 g of deionized water, 6.3 g of itaconic acid, 3.15 g of acrylic acid, 3.4 g of sodium lauryl polyethoxysulfate (Disponil® FES 27, 28% strength in water, BASF SE), 173.6 g of n-butyl acrylate, 192.0 g of methyl acrylate, and 0.6 g of 2-ethylhexyl thioglycolate. At the same time the reaction temperature was raised to 85° C. over 60 minutes. After the end of the first emulsion feed, the pH was adjusted to 7 using 5% strength ammonia over 10 minutes. Then a second emulsion feed, consisting of 45.6 g of deionized water, 2.3 g of sodium lauryl polyethoxysulfate (Disponil® FES 27, 28% strength in water, BASF SE), 6.3 g of isopropenyloxazoline, 143.8 g of n-butyl acrylate, and 104.8 g of methyl acrylate was metered in in 70 minutes. After the end of the feed, 31.5 g of deionized water were added and the temperature was lowered to 80° C. At an internal temperature of 80° C., 50.2 g of acetone bisulfite (4.8% strength) and 12.6 g of tert-butyl hydroperoxide (10% strength) were metered in over 60 minutes. This was followed by the addition of 34.3 g of deionized water, and the experiment was cooled to room temperature. After cooling, the dispersion was filtered through a 125 μm Perlon filter. The dispersion had a solids content of 50.7%, a pH of 7.0,an overall glass transition temperature of −16° C., and a particle size of 206 nm.

Example 3 Three-Stage Polymer Dispersion (2 pphm IPOx, Tg=−15° C.)

A 2L reactor with anchor stirrer, heated to 80° C., was filled with 6.1 g of a polystyrene seed (SC: 33%, PS: 30 nm) and 168.8 g of deionized water. When the internal temperature had reached 80° C., 45 g of a 7% strength sodium peroxodisulfate solution were added and the mixture was stirred for 2 minutes. This was followed by the metered addition over 60 minutes of 238.9 g of an emulsion consisting of 117.4 g of deionized water, 6.3 g of itaconic acid, 1.1 g of sodium lauryl polyethoxysulfate (Disponil® FES 27, 28% strength in water, BASF SE), 29.9 g of n-butyl acrylate, 83.5 g of methyl acrylate, and 0.6 g of 2-ethylhexyl thioglycolate. At the same time the reaction temperature was raised to 85° C. over 60 minutes. After the end of the first emulsion feed, a second emulsion feed took place, consisting of 45.6 g of deionized water, 3.2 g of acrylic acid, 2.3 g of sodium lauryl polyethoxysulfate (Disponil® FES 27, 28% strength in water, BASF SE), 143.8 g of n-butyl acrylate, and 108.5 g of methyl acrylate, which was metered in over 60 minutes. 15 minutes after the start of the second emulsion feed, a separate feed of 56.7 g of 5% strength ammonia was metered in at the same time over 45 minutes. When the second emulsion feed and the ammonia feed had ended, a third emulsion feed was metered in over 60 minutes, comprising 45.6 g of fully demineralized water, 2.3 g of sodium lauryl polyethoxy-sulfate (Disponil® FES 27, 28% strength in water, BASF SE), 140.7 g of n-butyl acrylate, 101.6 g of methyl acrylate, and 12.6 g of isopropenyloxazoline. After the end of the feed, 31.5 g of deionized water were added and the temperature was lowered to 80° C. At an internal temperature of 80° C., 8.7 g of acetone bisulfite (13.2% strength) and 12.6 g of tert-butyl hydroperoxide (10% strength) were metered in over 60 minutes. This was followed by addition of 34.3 g of deionized water and by the cooling of the experiment to room temperature. After cooling, the dispersion was filtered through a 125 μm Perlon filter. The dispersion had a solids content of 49.1%, a pH of 6.5,an overall glass transition temperature of −15° C., and a particle size of 179 nm.

Example 4 Three-Stage Polymer Dispersion (1.8 pphm IPOx, −14° C.)

A 2L reactor with anchor stirrer, heated to 80° C., was filled with 6.11 g of a polystyrene seed (SC: 33%, PS: 30 nm) and 172.0 g of deionized water. When the internal temperature had reached 80° C., 45 g of a 7% strength sodium peroxodisulfate solution were added and the mixture was stirred for 2 minutes. This was followed by the metered addition over 60 minutes of 238.9 g of an emulsion consisting of 117.4 g of deionized water, 6.3 g of itaconic acid, 1.1 g of sodium lauryl polyethoxysulfate (Disponil® FES 27, 28% strength in water, BASF SE), 29.9 g of n-butyl acrylate, 83.5 g of methyl acrylate, and 0.6 g of 2-ethylhexyl thioglycolate. At the same time the reaction temperature was raised to 85° C. over 60 minutes. After the end of the first emulsion feed, a second emulsion feed took place, consisting of 45.6 g of deionized water, 0.63 g of acrylic acid, 2.3 g of sodium lauryl polyethoxysulfate (Disponil® FES 27, 28% strength in water, BASF SE), 6.3 g of 2-hydroxypropyl acrylate, 140.7 g of n-butyl acrylate, and 107.9 g of methyl acrylate, which was metered in over 60 minutes. 15 minutes after the start of the second emulsion feed, a separate feed of 51.7 g of 3.66% strength ammonia was metered in at the same time over 45 minutes. When the second emulsion feed and the ammonia feed had ended, a third emulsion feed was metered in over 60 minutes, comprising 45.6 g of fully demineralized water, 2.3 g of sodium lauryl polyethoxysulfate (Disponil® FES 27, 28% strength in water, BASF SE), 6.3 g of 2-hydroxypropyl acrylate, 140.7 g of n-butyl acrylate, 96.2 g of methyl acrylate, and 11.7 g of isopropenyloxazoline. After the end of the feed, 31.5 g of deionized water were added and the temperature was lowered to 80° C. At an internal temperature of 80° C., 8.7 g of acetone bisulfite (13.2% strength) and 12.6 g of tert-butyl hydroperoxide (10% strength) were metered in over 60 minutes. This was followed by addition of 34.3 g of deionized water and by the cooling of the experiment to room temperature. After cooling, the dispersion was filtered through a 125 μm Perlon filter. The dispersion had a solids content of 48.9%, a pH of 7.5, an overall glass transition temperature of −14° C., and a particle size of 174 nm.

Example 5 Three-Stage Polymer Dispersion (1.4 pphm IPOx)

A 2L reactor with anchor stirrer, heated to 80° C., was filled with 6.11 g of a polystyrene seed (SC: 33%, PS: 30 nm) and 172.0 g of deionized water. When the internal temperature had reached 80° C., 45 g of a 7% strength sodium peroxodisulfate solution were added and the mixture was stirred for 2 minutes. This was followed by the metered addition over 60 minutes of 238.9 g of an emulsion consisting of 117.4 g of deionized water, 6.3 g of itaconic acid, 1.1 g of sodium lauryl polyethoxysulfate (Disponil® FES 27, 28% strength in water, BASF SE), 29.9 g of n-butyl acrylate, 83.5 g of methyl acrylate, and 0.6 g of 2-ethylhexyl thioglycolate. At the same time the reaction temperature was raised to 85° C. over 60 minutes. After the end of the first emulsion feed, a second emulsion feed took place, consisting of 45.6 g of deionized water, 0.63 g of acrylic acid, 2.3 g of sodium lauryl polyethoxysulfate (Disponil® FES 27, 28% strength in water, BASF SE), 6.3 g of 2-hydroxypropyl acrylate, 140.7 g of n-butyl acrylate, and 107.9 g of methyl acrylate, which was metered in over 60 minutes. 15 minutes after the start of the second emulsion feed, a separate feed of 51.7 g of 3.66% strength ammonia was metered in at the same time over 45 minutes. When the second emulsion feed and the ammonia feed had ended, a third emulsion feed was metered in over 60 minutes, comprising 45.6 g of fully demineralized water, 2.3 g of sodium lauryl polyethoxysulfate (Disponil® FES 27, 28% strength in water, BASF SE), 6.3 g of 2-hydroxypropyl acrylate, 140.7 g of n-butyl acrylate, 99.1 g of methyl acrylate, and 8.82 g of isopropenyloxazoline. After the end of the feed, 31.5 g of deionized water were added and the temperature was lowered to 80° C. At an internal temperature of 80° C., 8.7 g of acetone bisulfite (13.2% strength) and 12.6 g of tert-butyl hydroperoxide (10% strength) were metered in over 60 minutes. This was followed by addition of 34.3 g of deionized water and by the cooling of the experiment to room temperature. After cooling, the dispersion was filtered through a 125 μm Perlon filter. The dispersion had a solids content of 49.7%, a pH of 7, an overall glass transition temperature of −14° C., and a particle size of 183 nm.

Example 6 Three-Stage Polymer Dispersion (0.5 pphm IPOx)

A 2L reactor with anchor stirrer, heated to 80° C., was filled with 6.1 g of a polystyrene seed (SC: 33%, PS: 30 nm) and 172.0 g of deionized water. When the internal temperature had reached 80° C., 45 g of a 7% strength sodium peroxodisulfate solution were added and the mixture was stirred for 2 minutes. This was followed by the metered addition over 60 minutes of 238.9 g of an emulsion consisting of 117.4 g of deionized water, 6.3 g of itaconic acid, 1.1 g of sodium lauryl polyethoxysulfate (Disponil® FES 27, 28% strength in water, BASF SE), 29.9 g of n-butyl acrylate, 83.5 g of methyl acrylate, and 0.6 g of 2-ethylhexyl thioglycolate. At the same time the reaction temperature was raised to 85° C. over 60 minutes. After the end of the first emulsion feed, a second emulsion feed took place, consisting of 45.6 g of deionized water, 0.63 g of acrylic acid, 2.3 g of sodium lauryl polyethoxysulfate (Disponil® FES 27, 28% strength in water, BASF SE), 6.3 g of 2-hydroxypropyl acrylate, 140.7 g of n-butyl acrylate, and 107.9 g of methyl acrylate, which was metered in over 60 minutes. 15 minutes after the start of the second emulsion feed, a separate feed of 51.7 g of 3.7% strength ammonia was metered in at the same time over 45 minutes. When the second emulsion feed and the ammonia feed had ended, a third emulsion feed was metered in over 60 minutes, comprising 45.6 g of fully demineralized water, 2.3 g of sodium lauryl polyethoxysulfate (Disponil® FES 27, 28% strength in water, BASF SE), 6.3 g of 2-hydroxypropyl acrylate, 140.7 g of n-butyl acrylate, 104.9 g of methyl acrylate, and 3.0 g of isopropenyloxazoline. After the end of the feed, 31.5 g of deionized water were added and the temperature was lowered to 80° C. At an internal temperature of 80° C., 8.7 g of acetone bisulfite (13.2% strength) and 12.6 g of tert-butyl hydroperoxide (10% strength) were metered in over 60 minutes. This was followed by addition of 34.3 g of deionized water and by the cooling of the experiment to room temperature. After cooling, the dispersion was filtered through a 125 μm Perlon filter. The dispersion had a solids content of 49.6%, a pH of 7, an overall glass transition temperature of −15° C., and a particle size of 198 nm.

Comparative Example 7 No IPOx

A 2L reactor with anchor stirrer, heated to 80° C., was filled with 5.8 g of a polystyrene seed (SC: 33%, PS: 30 nm) and 163.8 g of deionized water. When the internal temperature reached 80° C., 42.9 g of 7% strength sodium peroxodisulfate solution were added and the mixture was stirred for 2 minutes. This was followed by the metered addition over 60 minutes of 227.5 g of an emulsion consisting of 111.8 g of deionized water, 6.0 g of itaconic acid, 1.1 g of sodium lauryl polyethoxysulfate (Disponil® FES 27, 28% strength in water, BASF SE), 28.5 g of n-butyl acrylate, 79.6 g of methyl acrylate, and 0.6 g of 2-ethylhexyl thioglycolate. At the same time the reaction temperature was raised to 85° C. over 60 minutes. After the end of the first emulsion feed, a second emulsion feed, consisting of 86.8 g of deionized water, 0.6 g of acrylic acid, 4.3 g of sodium lauryl polyethoxysulfate (Disponil® FES 27, 28% strength in water, BASF SE), 12.0 g of 2-hydroxypropyl acrylate, 267.9 g of n-butyl acrylate, and 205.5 g of methyl acrylate was metered in over 120 minutes. 15 minutes after the second emulsion feed was started, 3.66% strength ammonia was metered in via a separate feed, over 105 minutes, in a quantity of 49.2 g. After the end of the feed, 30.0 g of deionized water were added and the temperature was lowered to 80° C. At an internal temperature of 80° C., 8.2 g of acetone bisulfite (13.2% strength) and 12.0 g of tert-butyl hydroperoxide (10% strength) were metered in over 60 minutes. This was followed by the addition of 0.2 g of ammonia (25% strength) and 32.7 g deionized water, and the experiment was cooled to room temperature. After cooling, the dispersion was filtered through a 125 µm Perlon filter. The dispersion had a solids content of 50.7%, a pH of 6.5, an overall glass transition temperature of −15° C., and a particle size of 185 nm (hydrodynamic chromatography).

Comparative Example 8 Emulsifier-Containing

A 2L reactor with anchor stirrer, heated to 80° C., was filled with 6.1 g of a polystyrene seed (SC: 33%, PS: 30 nm) and 163.2 g of deionized water. When the internal temperature reached 80° C., 45.0 g of 7% strength sodium peroxodisulfate solution were added and the mixture was stirred for 2 minutes. This was followed by the metered addition over 120 minutes of 310.9 g of an emulsion consisting of 140.9 g of deionized water, 6.3 g of itaconic acid, 3.15 g of acrylic acid, 40.5 g of sodium lauryl polyethoxysulfate (Disponil® FES 27, 28% strength in water, BASF SE), 173.6 g of n-butyl acrylate, 192.0 g of methyl acrylate, and 0.6 g of 2-ethylhexyl thioglycolate. At the same time the reaction temperature was raised to 85° C. over 60 minutes. After the end of the first emulsion feed, the pH was adjusted to 7 using 5% strength ammonia over 15 minutes. Then a second emulsion feed, consisting of 23.0 g of deionized water, 27.0 g of sodium lauryl polyethoxysulfate (Disponil® FES 27, 28% strength in water, BASF SE), 6.3 g of isopropenyloxazoline, 143.2 g of n-butyl acrylate, and 104.8 g of methyl acrylate was metered in in 70 minutes. After the end of the feed, 31.5 g of deionized water were added and the temperature was lowered to 80° C. At an internal temperature of 80° C., 50.2 g of acetone bisulfite (4.8% strength) and 12.6 g of tert-butyl hydroperoxide (10% strength) were metered in over 60 minutes. This was followed by the addition of 44.8 g of deionized water, and the experiment was cooled to room temperature. After cooling, the dispersion was filtered through a 125 µm Perlon filter. The dispersion had a solids content of 49.4%, a pH of 7.0, an overall glass transition temperature of −16° C., and a particle size of 172 nm.

Production of Composite Films:

The neutralized polymer dispersions are knife-coated in a dry film thickness of 2 g/m² (based on the solids content) onto commercial films (OPP-ink; printed oriented polypropylene). After hot-air drying, the films thus coated are rolled up with a second film (metalized cast PP) and then pressed under a pressure of 6.5 bar and at 70° C. in a roller press at 5 m/min. The composite films are subsequently stored for 1 day at room temperature under standard conditions.

Determination of Peel Strength (Instantaneous Adhesion and Heat Stability):

For the determination of the peel strength, the composite films are cut up into strips 15 mm wide. The strips are then peeled at an angle of 2×90° (180° and at a speed of 100 mm/min at 23° C. in a universal testing machine for peel strengths, from Zwick (model 1120.25.01), and the force required to achieve this is recorded, in newtons. To determine the instantaneous adhesion, the peel strength was recorded after 1 minute at 23° C. To determine the heat stability, the peel strength was recorded at 90° C. in a heated chamber. In order to describe the chemical resistance of the adhesives, the laminates were stored in tomato ketchup at 50° C. for 7 days, after which their peel strengths were determined at 23° C. The results are compiled in Table 1.

TABLE 1

Test results, peel strength

| Example | Peel strength after 24 h [N/15 mm] | Heat stability at 90° C. [N/15 mm] | Peel strength after storage in ketchup [N/15 mm] |
|---|---|---|---|
| 1 | 3.5 (MF) | 0.5 | 2.5 |
| 2 | 2.5 | 0.6 | 2.6 |
| 3 | 3.2 (MF) | 0.5 | 2.7 |
| 3 [1] | 3.1 (MF) | 0.4 | 2.6 |
| 4 | 3.2 (MF) | 0.5 | 2.4 |
| 5 | 3.4 (MF) | 0.5 | 2.5 |
| 6 | 1.8 | 0.5 | 2.3 |
| 7 [2] | 1.8 | 0.1 | 0.4 |
| 8 [2] | 0.5 | 0.3 | 0.1 |

[1] after storage for 10 days at 50° C.
[2] comparative
MF: fracture in material

TABLE 2

Effect of emulsifier on instantaneous adhesion

| Example | Instantaneous adhesion [N/15 mm] | Peel strength after 24 h [N/15 mm] |
|---|---|---|
| 3 | 2.5 | 3.2 |
| 3 + 2.5 pphm Disponil FES 27 | 1.0 | 1.9 |
| 2 | 2.1 | 2.6 |
| 8 (comparative) | 0.5 | 1.0 |

The results show that the copolymerization of oxazoline-containing monomers in an emulsion polymer stage after the neutralization of the acid monomers in the first stage produces a significant improvement in the peel strengths, even under thermal load and especially under the influence of aggressive media (after storage in ketchup, for example). The paucity of emulsifier endows the dispersions with excellent instantaneous adhesion (Table 2).

The invention claimed is:

1. A laminating adhesive, comprising an aqueous polymer dispersion comprising a polymer having a glass transition temperature of less than −10° C., wherein the polymer comprises, in polymerized form:
    ethylenically unsaturated, radically polymerizable monomers;
    at least one monomer having at least one acid group, in an amount of at least 0.1 part by weight, based on 100 parts by weight of all polymerizable monomers; and
    at least one monomer having at least one oxazoline group.

2. The laminating adhesive of claim 1, wherein the polymer comprises from 0.5 to 4 parts by weight of the at least one monomer having at least one oxazoline group, based on 100 parts by weight of all polymerizable monomers.

3. The laminating adhesive of claim 1, wherein the at least one monomer having at least one oxazoline group is a monomer of formula:

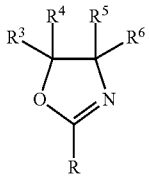

wherein:
R is a $C_{2-20}$ alkenyl radical comprising at least one ethylenically unsaturated group; and
$R^3$, $R^4$, $R^5$, and $R^6$ are selected independently of one another from the group consisting of H, halogen, $C_{1-20}$ alkyl, $C_{2-20}$ alkenyl, $C_{6-20}$ aryl, $C_{7-32}$ arylalkyl, $C_1$-$C_{20}$ hydroxyalkyl, $C_{1-20}$ aminoalkyl, and $C_{1-20}$ haloalkyl.

4. The laminating adhesive of claim 1, wherein the at least one monomer having at least one oxazoline group is selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline, and 2-isopropenyl-4,4,5,5-tetramethyl-2-oxazoline.

5. The laminating adhesive of claim 1, wherein: the monomers comprising acid groups are selected from the group consisting of acrylic acid, methacrylic acid, itaconic acid, maleic acid, fumaric acid, crotonic acid, vinylacetic acid, vinyllactic acid, unsaturated phosphonic acids, and mixtures of these monomers.

6. The laminating adhesive of claim 1, wherein the ethylenically unsaturated, radically polymerizable monomers are exclusively derivatives of (meth)acrylic acid.

7. The laminating adhesive of claim 1, wherein the polymer further comprises a latex.

8. A staged radical emulsion polymerization process for preparing the laminated adhesive of claim 1, the process comprising:
a first stage in which a first composition comprising ethylenically unsaturated, radically polymerizable monomers is subjected to radical emulsion polymerization in an aqueous medium, to obtain a first polymer dispersed in water; and then
a second stage in which a second composition, which is different from the first composition and comprises ethylenically unsaturated, radically polymerizable monomers, is subjected to radical emulsion polymerization in an aqueous medium and in the presence of the first polymer,
wherein:
the first composition comprises the at least one monomer having at least one acid group, in an amount of at least 0.1 part by weight, based on 100 parts by weight of the monomers of all stages;
the second composition comprises the at least one monomer having at least one oxazoline group;
the radical emulsion polymerization of the first stage occurs at a pH less than 5 and, before the radical emulsion polymerization of the second stage, acid groups are neutralized with a volatile base to an extent such that the pH of the first polymer dispersed in water before the second stage is greater than 5; and
less than 0.5 part by weight, based on 100 parts by weight of monomers, of an emulsifier is optionally present in the staged radical emulsion polymerization process.

9. A composite film, comprising a first film and at least one second film, which are bonded to one another with the laminating adhesive of claim 1.

10. A process for producing composite films, the process comprising bonding at least two films with one another using the laminating adhesive of claim 1.

11. The laminating adhesive of claim 1, wherein the glass transition temperature of the polymer is less than −14° C.

12. The process of claim 8, wherein no emulsifier is present in the staged radical emulsion polymerization process.

13. The process of claim 8, wherein, in the first stage, monomers comprising acid groups are copolymerized with monomers without acid groups, and a weight ratio of the monomers comprising acid groups to the monomers without acid groups ranges from 5:95 to 15:85.

14. The process of claim 8, wherein at least 60% by weight of the monomers used in the second stage are selected from the group consisting of C1 to C20 alkyl acrylates, C1 to C20 alkyl methacrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers.

15. The process of claim 8, wherein a chain transfer agent is present during the first stage.

16. The process of claim 8, wherein a weight ratio of monomers used in the first stage to monomers used in the second stage is from 10:90 to 65:35.

17. The process of claim 8, wherein the monomers used in the second stage comprise not more than 1 part by weight, based on 100 parts by weight, of monomers with acid groups, or comprise no monomers with acid groups.

18. The process of claim 8, wherein less than 0.3 part by weight, based on 100 parts by weight of monomers, of the emulsifier is optionally present in the staged radical emulsion polymerization process.

* * * * *

UNITED STATES PATENT AND TRADEMARK OFFICE
CERTIFICATE OF CORRECTION

PATENT NO. : 10,364,379 B2
APPLICATION NO. : 15/558326
DATED : July 30, 2019
INVENTOR(S) : Matthias Zorn et al.

Page 1 of 1

It is certified that error appears in the above-identified patent and that said Letters Patent is hereby corrected as shown below:

In the Specification

Column 2, Line 47, "apolar" should read -- a polar --,

Column 8, Line 22, "$C_1$ to $C_2o$" should read -- $C_1$ to $C_{20}$ --.

Signed and Sealed this
Seventh Day of January, 2020

Andrei Iancu
*Director of the United States Patent and Trademark Office*